United States Patent
Eichenauer et al.

(10) Patent No.: US 6,890,979 B2
(45) Date of Patent: May 10, 2005

(54) POLYCARBONATE MOLDING MATERIALS CONTAINING GRAFT RUBBER

(75) Inventors: Herbert Eichenauer, Dormagen (DE); Thomas Eckel, Dormagen (DE); Holger Warth, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 82 days.

(21) Appl. No.: 10/220,769

(22) PCT Filed: Feb. 27, 2001

(86) PCT No.: PCT/EP01/02190

§ 371 (c)(1),
(2), (4) Date: Sep. 5, 2002

(87) PCT Pub. No.: WO01/66640

PCT Pub. Date: Sep. 13, 2001

(65) Prior Publication Data

US 2003/0060565 A1 Mar. 27, 2003

(30) Foreign Application Priority Data

Mar. 9, 2000 (DE) ............................ 100 11 544
Jul. 25, 2000 (DE) ............................ 100 36 056

(51) Int. Cl.[7] ........................... C08L 67/00; C08L 69/00
(52) U.S. Cl. ........................ 524/115; 524/121; 524/127; 524/123; 524/131; 524/147
(58) Field of Search ..................... 524/115, 121, 524/127, 123, 131, 147; 525/67, 71

(56) References Cited

U.S. PATENT DOCUMENTS

| 5,204,394 | A | 4/1993 | Gosens et al. ............ 524/125 |
| 5,741,853 | A | 4/1998 | Eichenauer et al. ........ 525/71 |
| 5,883,189 | A | 3/1999 | Eichenauer et al. ........ 525/71 |
| 5,883,190 | A | 3/1999 | Eichenauer ............... 525/71 |
| 5,969,041 | A | 10/1999 | Eichenauer et al. ........ 525/71 |
| 6,489,379 | B1 * | 12/2002 | Eichenauer ............... 523/201 |

FOREIGN PATENT DOCUMENTS

| DE | 196 39 821 | 4/1998 |
| DE | 198 58 731 | 6/2000 |
| EP | 0 482 451 | 4/1992 |
| EP | 745 624 | 12/1996 |
| EP | 0 755 977 | 1/1997 |
| EP | 0 771 851 | 5/1997 |
| WO | 00/00544 | 1/2000 |
| WO | 00/04067 | 1/2000 |

* cited by examiner

*Primary Examiner*—Jeffrey Mullis
(74) *Attorney, Agent, or Firm*—Joseph C. Gil; Aron Preis

(57) ABSTRACT

A thermoplastic molding composition having improved mechanical properties is disclosed. The composition contains (A) aromatic polycarbonate and/or polyester carbonate (B) at least one graft rubber, obtained by emulsion polymerization of styrene and acrylonitrile in the presence of at least two rubber latices of type (B1) and (B2) where (B1) has a particle diameter $d_{50}$ of $\leq 350$ nm, a particle size distribution range of 30 nm to 100 nm, and a gel content of 70 wt. %, and (B2) has a particle diameter of $\geq 350$ nm, a particle size distribution range of 50 nm to 500 nm, and a gel content of $\geq 70$ wt. %, and the difference in the average particle diameter of B1 and B2 is $\geq 50$ nm, (C) an optional copolymer of styrene and or acrylonitrile and for methyl methacrylate and/or N-substituted maleinimide, and optionally (D) flame retardant as well as optionally conventional additives.

17 Claims, No Drawings

POLYCARBONATE MOLDING MATERIALS CONTAINING GRAFT RUBBER

The present invention relates to thermoplastic polycarbonate/graft polymer moulding compositions with improved mechanical properties (particularly impact strength and elongation at break) and improved processing performance (flow properties).

The special graft rubbers according to the present invention are generally well known (EP-A 745 624 and U.S. Pat. No. 5,741,853). They are characterised by good toughness, processability and surface quality (gloss, impression of colour). It is generally mentioned that the graft rubbers may be used in thermoplastic resins such as aromatic polycarbonates, polyesters, polyamides, the proportion of graft rubbers in the moulding compositions being preferably 10 wt. % to 80 wt. %, particularly 20 wt. % to 75 wt. %. No indication as to which advantageous properties such moulding compositions possess can be derived from the document. EP-A 745 624 does not disclose the compositions according to the invention in accordance with the present application.

DE-A 196 39 821 discloses polycarbonate-ABS mixtures of which the ABS part comprises a mixture of graft polymers of varying particle size and which are characterised by improved processing performance. The mechanical properties which can be achieved with such moulding compositions, particularly the combination of notched impact strength and elongation at break is not, however, sufficient for many applications.

Flame-resistant polycarbonate-ABS moulding compositions are also having to meet increasingly stringent requirements in terms of the mechanical properties.

The use of organic phosphates such as oligophosphates as flame retardants for polycarbonate moulding compositions is well known and described, for example, in EP-A 0 363 608, EP-A 0 771 851 and EP-A 0 755 977. A problem of using such oligophosphates as flame retardants is always the associated deterioration in the mechanical properties.

The object was, therefore, to provide polycarbonate/graft polymer (particularly of the ABS type) moulding compositions with improved mechanical properties, particularly a combination of impact strength and elongation at break and improved processing performance.

It has now been found that the use of special graft rubber systems with a special bimodal particle size distribution and special gel contents in the rubber main chains in polycarbonates results in moulding compositions which have the desired range of properties.

The invention provides a composition containing

A) 5 to 95 parts by wt., preferably 10 to 90 parts by wt., particularly preferably 20 to 80 parts by wt. of aromatic polycarbonate, B) 1 to 50 parts by wt., preferably 2 to 40 parts by wt. and particularly preferably 3 to 30 parts by weight of at least one graft rubber, which can be obtained by emulsion polymerisation of styrene and acrylonitrile in the weight ratio 90:10 to 50:50, wherein styrene and/or acrylonitrile may be replaced wholly or partly by α-methylstyrene, methyl methacrylate or N-phenylmaleinimide, in the presence of at least two rubber latices of type (A) and (B) which contain in each case 0 wt. % to 50 wt. % of a further vinyl monomer in copolymerised form, and wherein the weight ratio of monomers used to rubber latices used is 25:75 to 70:30, characterised in that the rubber latex (B1) has a particle diameter $d_{50}$ of $\leq 350$ nm, preferably 260 nm to 310 nm, a particle size distribution range (measured as $d_{90}$-$d_{10}$ from the integral particle size distribution) from 30 nm to 100 nm, preferably from 40 nm to 80 nm, and a gel content of $\leq 70$ wt. %, preferably 40 wt. % to 65 wt. %, and the rubber latex (B2) has a particle diameter $d_{50}$ of $\geq 350$ nm, preferably 380 nm to 450 nm, a particle size distribution range (measured as $d_{90}$-$d_{10}$ from the integral particle size distribution) from 50 nm to 500 nm, preferably from 100 nm to 400 nm, and a gel content of $\geq 70$ wt. %, preferably 75 wt. % to 90 wt. %, and the difference in the average particle diameter is $\geq 50$ nm, preferably $\geq 80$ nM, particularly preferably $\geq 100$ nm, C) 0 to 50 parts by wt., preferably 0 to 40 parts by wt. and particularly preferably 0 to 30 parts by wt. of at least one thermoplastic homo-, co- or terpolymer containing styrene, α-methylstyrene, acrylonitrile, methyl methacrylate, N-substituted maleinimide or mixtures thereof, and optionally D) 0.5 to 25 parts by wt., preferably 2 to 20 parts by wt. and particularly preferably 3 to 15 parts by wt. (in each case, per 100 parts by wt. of A+B+C+D) of at least one flame retardant and optionally conventional additives such as lubricants, antistatic agents, mould release agents or mixtures thereof.

The sum of the parts by weight of all components A+B+C+D totals 100.

Component A

Thermoplastic, aromatic polycarbonates according to component A which are suitable according to the invention are those based on diphenols corresponding to the formula (I)

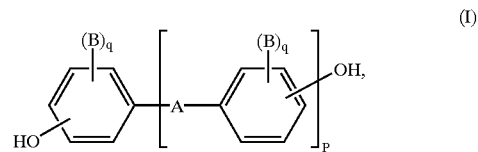

wherein

A is a single bond, $C_1$–$C_5$-alkylene, $C_2$–$C_5$-alkylidene, $C_5$–$C_6$-cycloalkylidene, —S— or —SO$_2$—, B is chlorine, bromine, q is 0, 1 or 2 and p is 1 or 0 or alkyl-substituted dihydroxyphenyl cycloalkanes corresponding to the formula (II),

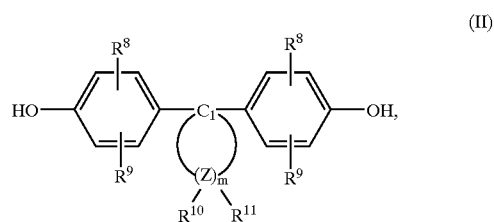

wherein $R^8$ and $R^9$ independently of one another, mean hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, particularly benzyl, m means an integer of 4, 5, 6 or 7, preferably 4 or 5, $R^{10}$ and $R^{11}$ which may be selected individually for each Z, independently of one another, mean hydrogen or $C_1$–$C_6$-alkyl, and z means carbon, provided that on at least one Z atom $R^{10}$ and $R^{11}$ simultaneously mean alkyl.

Examples of suitable diphenols corresponding to formula (I) include hydroquinone, resorcinol, 4,4-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols corresponding to formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols corresponding to formula (II) are 1,1-bis-(4-hydroxyphenyl)-3-3,-dimethylcyclohexane, 1,1-bis-(4-hydroxyphenyl-3,3,5-trimethylcyclohexane and 1,1-bis-(4-hydroxyphenyl)-2,4,4-trimethylcyclopentane.

Suitable polycarbonates according to the invention are both homopolycarbonates and copolycarbonates.

Component A may also be a mixture of the thermoplastic polycarbonates defined above.

Polycarbonates may be prepared in the known way from diphenols with phosgene by the phase boundary process or with phosgene by the process in a homogeneous phase, known as the pyridine process, wherein the molecular weight may be adjusted in a known manner by an appropriate amount of known chain terminators.

Examples of suitable chain terminators include phenol, p-chlorophenol, p.-tert.-butylphenol or 2,4,6-tribromophenol, and also long-chain alkyl phenols, such as 4-(1,3-tetramethylbutyl)-phenol according to DE-OS 2 842 005 (Le A 19 006) or monoalkylphenol or dialkylphenol with a total of 8 to 20 carbon atoms in the alkyl substituents according to German patent application P 3 506 472.2 (Le A 23 654), such as 3,5-di-tert.-butylphenol, p-isooctylphenol), p-tert.-octylphenol, p-dodecylphenol and 2-(3,5-dimethylheptyl)-phenol and 4-(3,5-dimethylheptyl)-phenol.

The amount of chain terminators is generally from 0.5 mole % to 10 mole %, based on the sum of the diphenols used in each case and corresponding to formulae (I) and/or (II).

Suitable polycarbonates A according to the invention have average molecular weights ($\overline{M}_w$, weight-average, measured, e.g. by ultracentrifugation or scattered light measurement) from 10,000 to 200,000, preferably 20,000 to 80,000.

Suitable polycarbonates A according to the invention may be branched in a known way, preferably by the incorporation of 0.05 mole % to 2 mole %, based on the sum of diphenols used, of tri- or more than trifunctional compounds, e.g. those with three or more than three phenolic groups.

Preferred polycarbonates, apart from the bisphenol A-homopolycarbonate, are the copolycarbonates of bisphenol A with up to 15 mole %, based on the mole sums of diphenols, of 2,2-bis-(3,5-dibromo-4-hydroxyphenyl)-propane and the copolycarbonates of bisphenol A with up to 60 mole %, based on the mole sums of diphenols, of 1,1-bis-(4-hydroxyphenyl)-3,3,5-trimethylcyclohexane.

Preferred polycarbonates may also be copolycarbonates with polysiloxane structures.

Component B

In graft polymerisation, a mixture of at least two rubber latices, one of each type B1 and B2, is used. The weight ratio B1:B2, based on the solids proportion of the latices in each case, is preferably 90:10 to 10:90, particularly preferably 60:40 to 30:70.

Examples of suitable rubber latices include, and are preferably selected from, diene rubbers, EP(D)M rubbers, i.e. those based on ethylene/propylene and optionally dienes and acrylate rubbers. They generally have glass transition temperatures below 10° C., preferably 0° C., particularly preferably below −10° C. Diene rubbers are preferred. Particularly preferred diene rubbers are based on butadiene and may contain, as comonomers, up to 50 wt. %, preferably up to 30 wt. % (based on the total amount of monomer used to prepare the rubber latex) of other monomers selected from the group comprising isoprene, chloroprene, acrylonitrile, styrene, α-methylstyrene, $C_1$–$C_4$-alkylstyrenes, $C_1$–$C_8$-alkylacrylates, $C_1$–$C_8$-alkylmethacrylates, alkylene glycol diacrylates, alkylene glycol dimethacrylates, divinylbenzene or mixtures thereof. Preferred comonomers are styrene, acrylonitrile or methyl (meth)acrylate or mixtures thereof. Polybutadiene is particularly preferred. The rubber latices B1 and B2 may be prepared by emulsion polymerisation of the corresponding monomers. This polymerisation reaction is well known and described, e.g., in Houben-Weyl, Methoden der Organischen Chemie, Makromolekulare Stoffe, part 1, p. 674 (1961), Thieme Verlag Stuttgart. It is also possible to prepare a fine-particle rubber latex first by known methods and then to agglomerate this in a known way in order to obtain the required particle size.

Relevant methods are described (cf. EP-A 0 029 613; EP-A 0 007 810; DD-A 144 415, DE-A 1 233 131; DE-A 1 258 076; DE-A 2 101 650; U.S. Pat. No. 1,379,391).

It is also possible to operate according to the so-called seed polymerisation method in which a fine-particle butadiene polymer is prepared first and then further polymerised to larger particles by further conversion with monomers containing butadiene.

Graft polymerisation takes place preferably by feeding monomer to the mixture of butadiene polymer latices B1 and B2 in such a way that 55 wt. % to 90 wt. %, preferably 60 wt. % to 80 wt. % and particularly preferably 65 wt. % to 75 wt. % of the monomers are added within the first half of the monomer feed time.

In principle, the butadiene polymer latices B1 and B2 may also be prepared by emulsifying fine-particle butadiene polymers in aqueous media (cf. Japanese patent application JP-A 55 125 102).

The butadiene polymer latex B1 has an average particle diameter $d_{50}$ of ≦350 nm, preferably 260 nm to 310 nm, a particle size distribution range (measured as $d_{90}$-$d_{10}$ from the integral particle size distribution) from 30 nm to 100 nm, preferably from 40 nm to 80 nm, and a gel content of ≦70 wt. %, preferably 40 wt. % to 65 wt. %.

The rubber latex B2 has an average particle diameter $d_{50}$ of ≧350 nm, preferably 380 nm to 450 nm, a particle size distribution range (measured as $d_{90}$-$d_{10}$ from the integral particle size distribution) from 50 nm to 500 nm, preferably from 100 nm to 400 nm, and a gel content of ≧70 wt. %, preferably 75 wt. % to 90 wt. %.

The rubber latices according to the invention are characterised in that the difference in the average particle diameter is ≧50 nm, preferably ≧80 nm and particularly preferably ≧100 nm. More particularly preferably, the rubber latices have a difference in the average particle diameter from 80 nm to 350 run, preferably 100 nm to 250 nm.

The determination of the average particle diameter $d_{50}$ and of the $d_{10}$ and $d_{90}$ values may be carried out by ultracentrifuge measurement (cf. W. Scholtan, H. Lange: Kolloid Z. u. Z. Polymere 250, p. 782 to 796 (1972)), the given values for the gel content relate to the determination by the wire cage method in toluene (cf. Houben-Weyl, Methoden der Organischen Chemie, Makromolekulare Stoffe, part 1, p. 307 (1961), Thieme Verlag, Stuttgart).

The gel contents of the rubber latices B1 and B2 may be adjusted in a manner known in principle by using suitable reaction conditions (e.g. high reaction temperature and/or polymerisation to a high conversion and optional addition of substances with a crosslinking effect in order to obtain a high gel content or, e.g., low reaction temperature and/or termination of the polymerisation reaction before excessive crosslinking occurs, and optionally addition of molecular weight regulators such as, for example, n-dodecylmercaptan or t-dodecylmercaptan in order to obtain a low gel content). Emulsifiers which may be used include the usual anionic emulsifiers such as alkyl sulfates, alkyl sulfonates, aralkyl sulfonates, soaps of saturated or unsaturated fatty acids and of alkaline disproportionated or hydrogenated abietic or tall oil acids; emulsifiers with carboxyl groups (e.g. salts of $C_{10}$–$C_{18}$ fatty acids, disproportionated abietic acid) are used in preference.

Graft polymerisation may be carried out in such a way that the monomer mixture is added continuously to the mixture of rubber latices B1 and B2 and polymerised.

Special monomer: rubber ratios and a defined procedure for adding the monomers to the rubber latex are observed in preference.

In order to produce the products according to the invention, preferably 25 to 70 parts by wt., particularly preferably 30 to 60 parts by wt. of a mixture of styrene and acrylonitrile, which may optionally contain up to 50 wt. % (based on the total amount of monomers used in graft polymerisation) of one or more comonomers, are polymerised in the presence of preferably 30 to 75 parts by wt., particularly preferably 40 to 70 parts by wt. (based on solids in each case) of the butadiene polymer latex mixture of B1 and B2.

The monomers used in this graft polymerisation are preferably mixtures of styrene and acrylonitrile in the weight ratio 90:10 to 50:50, particularly preferably in the weight ratio 65:35 to 80:20, where styrene and/or acrylonitrile may be replaced wholly or partly by copolymerisable monomers, preferably by α-methylstyrene, methyl methacrylate or N-phenylmaleinimide.

In addition, molecular weight regulators may be used in graft polymerisation, preferably in amounts from 0.05 wt. % to 2 wt. %, particularly preferably in amounts from 0.1 wt. % to 1 wt. % (in each case based on total amount of monomer in the graft polymerisation step). Examples of suitable molecular weight regulators include n-dodecylmercaptan, t-dodecylmercaptan, dimeric α-methylstyrene, terpinols.

Suitable initiators include inorganic and organic peroxides, e.g., $H_2O_2$, di-tert.-butyl peroxide, cumene hydroperoxide, dicyclohexyl percarbonate, tert.-butyl hydroperoxide, p-menthane hydroperoxide, azo initiators such as, e.g., azobisisobutyronitrile, inorganic persalts such as ammonium, sodium or potassium persulfate, potassium perphosphate, sodium perborate and redox systems which are composed of an oxidising agent, usually organic, and a reducing agent, heavy metal ions also being present in the reaction medium (see H. Logemann in Houben-Weyl, Methoden der Organischen Chemie, vol. 14/1, p. 263 to 297).

The reaction temperature is 25° C. to 160° C., preferably 40° C. to 90° C. The above-mentioned compounds may be used as emulsifiers.

In order to produce the products according to the invention, graft polymerisation is carried out preferably by adding monomers in such a way that 55 wt. % to 90 wt. %, preferably 60 wt. % to 80 wt. % and particularly preferably 65 wt. % to 75 wt. % of the total monomers to be used in graft polymerisation are added within the first half of the total monomer addition time; the remaining proportion of monomers is added within the second half of the total monomer addition time.

Finally, the graft polymer thus produced is mixed with at least one thermoplastic resin (component C). This can take place in various ways. If the thermoplastic resin itself was produced by emulsion polymerisation, the latices may be mixed, and precipitated and worked up together. If the thermoplastic resin was produced by solution or bulk polymerisation, the graft polymer must be isolated by known methods, for example, by spray drying or by the addition of salts and/or acids, washing the precipitation products and drying the powder, and then mixed with the thermoplastic resin preferably present in the form of granules (preferably on multi-roll mills, compounding extruders or internal mixers); this method is used in preference.

Component C

Component C comprises one or more thermoplastic vinyl (co)polymers.

Suitable vinyl co(polymers) C are polymers of at least one monomer from the group comprising vinyl aromatics, vinyl cyanides (unsaturated nitrites), (meth)acrylic acid-($C_1$–$C_8$)-alkyl esters, unsaturated carboxylic acids and derivatives (such as anhydrides and imides) of unsaturated carboxylic acids. Particularly suitable (co)polymers are (co)polymers of C.1 50 to 99 parts by wt., preferably 60 to 80 parts by wt. of vinyl aromatics and/or vinyl aromatics substituted on the nucleus such as, for example, styrene, α-methylstyrene, p-methylstyrene, p-chlorostyrene and/ or methacrylic acid-($C_1$–$C_8$)-alkyl esters such as, e.g., methyl methacrylate, ethyl methacrylate, and C.2 1 to 50 parts by wt., preferably 20 to 40 parts by wt. of vinyl cyanides (unsaturated nitrites) such as acrylonitrile and methacrylonitrile and/or (meth)acrylic acid ($C_1$–$C_8$)-alkyl esters (such as, e.g., methyl methacrylate, n-butyl acrylate, t-butyl acrylate) and/or unsaturated carboxylic acids (such as maleic acid) and/or derivatives (such as anhydrides and imides) of unsaturated carboxylic acids (for example, maleic anhydride and N-phenyl maleinimide).

The (co)polymers C are resin-like, thermoplastic and rubber-free.

The copolymer of C.1 styrene and C.2 acrylonitrile is particularly preferred.

Preferred vinyl resins are copolymers of styrene and acrylonitrile in the weight ratio 90:10 to 50:50, where styrene and/or acrylonitrile may be replaced wholly or partly by α-methylstyrene and/or methyl methacrylate.

The (co)polymers according to C are well known and may be prepared by free-radical polymerisation, particularly by emulsion, suspension, solution or bulk polymerisation (see, e.g. DE-AS 2 420 385, DE-A 2 724 360). The (co)polymers preferably have molecular weights $\overline{M}_w$ (weight-average, determined by light scattering or sedimentation) from 15,000 to 200,000.

Component D

Suitable components D to be used according to the invention are flame retardants and optionally conventional additives such as lubricants, antistatic agents, mould release agents or mixtures.

Examples of flame retardants are both halogen-containing and halogen-free compounds.

Suitable halogen compounds are organic chlorine and/or bromine compounds.

Examples of halogen-containing flame retardants include
1. Chlorinated and brominated diphenyls such as octachlorodiphenyl, decachlorodiphenyl, octabromodiphenyl, decabromodiphenyl.
2. Chlorinated and brominated diphenyl ethers such as octa- and decachlorodiphenylethers and octa- and decabromodiphenylethers.
3. Chlorinated and brominated phthalic anhydride and derivatives thereof such as phthalimides and bisphthalimides, e.g., tetrachloro- and tetrabromophthalic anhydride, tetrachloro- and tetrabromophthalimide, N,N'-ethylene-bis-tetrachloro and N,N'-ethylene-bis-tetrabromophthalimide, N-methyltetrachloro- and N-methyltetrabromophthalirmide.
4. Chlorinated and brominated bisphenols such as 2,2-bis-(3,5-di-chloro-4-hydroxyphenyl)-propane and 2,2-bis-(3, 5-di-bromo-4-hydroxyphenyl)-propane.
5. 2,2-Bis-(3,5-di-chloro-4-hydroxyphenyl)-propane oligocarbonate and 2,2-bis-(3,5-di-bromo-4-hydroxyphenyl)-propane oligocarbonate with an average degree of polycondensation from 2 to 20.

Bromine compounds are preferred to chlorine compounds. Halogen-free flame retardants are preferred.

Suitable flame retardants are preferably all the phosphorus compounds usually used for this purpose, particularly phosphine oxides and derivatives of acids of phosphorus and salts of acids and acid derivatives of phosphorus.

Derivatives (e.g. esters) of acids of phosphorus and salts thereof are preferred, acids of phosphorus including phosphoric acid, phosphonic acid, phosphinic acid, phosphorous acid, and the dehydrated form in each case, salts being preferably alkali, alkaline earth and ammonium salts of said acids and the derivates thereof (for example, partially esterified acids) also being included.

Particularly preferred phosphorus compounds are those corresponding to the formula (III)

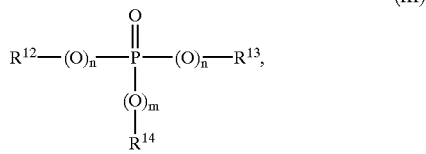

(III)

wherein
$R^{12}$ $R^{13}$ and $R^{14}$ independently of one another, mean an optionally halogenated $C_1$–$C_8$-alkyl or an optionally halogenated and/or alkylated $C_5$ or $C_6$-cycloalkyl or an optionally halogenated and/or alkylated and/or aralkylated $C_6$–$C_{30}$-aryl
and
n and m independently of one another, are 0 or 1.

These phosphorus compounds are generally known (see, for example, Ullmann, Enzyklopädie der technischen Chemie, vol. 18, pages 301 ff, 1979). The aralkylated phosphorus compounds are described, for example, in DE-OS 38 24 356 0.

Optionally halogenated $C_1$–$C_8$-alkyl radicals according to compounds corresponding to formula (III) and (IV) may be mono- or polyhalogenated, linear or branched. Examples of alkyl radicals are chloroethyl, 2-chloropropyl, 2,3-dibromopropyl, butyl, methyl or octyl.

Optionally halogenated and/or alkylated $C_5$ or $C_6$-cycloalkyls according to compounds corresponding to formula (III) and/or (IV) are optionally mono- to polyhalogenated and/or alkylated $C_5$ or $C_6$-cycloalkyls, that is, e.g., cyclopentyl, cyclohexyl, 3,3,3-trimethylcyclohexyl and fully chlorinated cyclohexyl.

Optionally halogenated and/or alkylated and/or aralkylated $C_6$–$C_{30}$-aryl radicals according to compounds corresponding to formula (III) are optionally mono- or polynuclear, mono- or polyhalogenated and/or alkylated and/or aralkylated, e.g., chlorophenyl, bromophenyl, pentachlorophenyl, pentabromophenyl, phenyl, cresyl, isopropylphenyl, benzyl-substituted phenyl and naphthyl.

Examples of suitable phosphorus compounds corresponding to formula (III) according to the invention include tributyl phosphate, tris-(2-chloroethyl)phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl) phosphate, tris-(p-benzylphenyl) phosphate, triphenylphosphine oxide, methanephosphonic acid dimethyl ester, methanephosphonic acid diphenyl ester and phenylphosphonic acid diethylester.

Moreover, suitable flame retardants are oligomeric phosphorus compounds corresponding to the formula (IV)

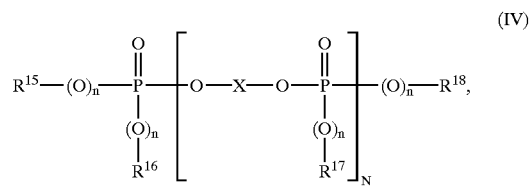

(IV)

wherein
$R^{15}$, $R^{16}$, $R^{17}$, $R^{18}$ independently of one another, mean $C_1$–$C_8$-alkyl, preferably methyl, $C_5$–$C_6$-cycloalkyl, $C_6$–$C_{10}$-aryl, preferably phenyl, $C_7$–$C_{12}$-aralkyl, preferably phenyl-$C_1$–$C_4$-alkyl,
n independently of one another, means 0 or 1,
N means 1 to 5 and
X means a mono- or polynuclear aromatic radical having 6 to 30 carbon atoms; preferably derived from diphenols corresponding to formula (I), particularly from bisphenol A, hydroquinone or resorcinol.

In mixtures of several phosphates corresponding to formula (IV), N represents a mean between 1 and 5.

The molecular weight of the phosphorus compounds corresponding to formula (IV) is generally less than 2000 g/mole, preferably less than 1000 g/mole. These are described, for example, in EP-A 0 363 608.

Preferred flame retardants are also mixtures of phosphorus compounds corresponding to formula (III) and phosphorus compounds corresponding to formula (IV).

The compositions according to the invention generally contain 0.5 to 25 parts by wt., preferably 2 to 20 parts by wt., particularly 3 to 15 parts by wt. of phosphorus compounds (based on 100 parts by wt. of the total composition) as flame retardants.

Examples of lubricants are hydrocarbons (e.g., paraffin oils, polyethylene waxes), alcohols (e.g., stearyl alcohol), carboxylic acids (e.g. lauric acid, palmitic acid, stearic acid), carboxylic acid amides (stearic acid amide, ethylene diamine bis-stearylamide), carboxylic acid esters (e.g., n-butyl stearate, stearyl stearate, glycerol monostearate, glycerol tristearate, pentaerythritol tetrastearate); preferred lubricants are carboxylic acid amides and carboxylic acid esters.

Examples of antistatic agents are cationic compounds (e.g., quaternary ammonium, phosphonium or sulfonium salts), anionic compounds (e.g., alkylsulfonates, alkylsulfates, alkylphosphates, carboxylates in the form of alkali or alkaline earth metal salts), nonionic compounds (e.g., polyethylene glycol esters, polyethylene glycol ethers, fatty acid esters, ethoxylated fatty amines); preferred antistatic agents are nonionic compounds.

Examples of mould release agents are calcium stearate, zinc stearate, pentaerythritol tetrastearate; the preferred mould release agent is pentaerythritol tetrastearate.

In the event of particular requirements regarding flame retardancy, the polycarbonate/graft polymer moulding compositions may contain fluorinated polyolefins. These are high molecular weight compounds and have glass transition temperatures above −30° C., usually above 100° C., fluorine contents preferably from 65 wt. % to 76 wt. %, preferably from 70 wt. % to 76 wt. %, average particle diameters $d_{50}$ from 0.05 μm to 1000 μm, preferably 0.08 μm to 20 μm. The fluorinated polyolefins generally have a density from 1.2 g/cm$^3$ to 2.3 g/cm$^3$. Preferred fluorinated polyolefins are polytetrafluoroethylene, polyvinylidene fluoride, tetrafluoroethylene/hexafluoro-propylene and ethylene/tetrafluoroethylene copolymers. The fluorinated polyolefins are well known (cf. "Vinyl and Related Polymer" by Schildknecht, John Wiley & Sons, Inc., New York, 1962, pages 484–494; "Fluorpolymers" by Wall, Wiley-Interscience, John Wiley & Sons, Inc., New York, vol, 13, 1970, page 623–654; "Modern Plastics Encyclopedia", 1970–1971, vol, 47, no. 10 A, October 1970, McGraw-Hill Inc., New York, page 134 and 774; "Modern Plastics Encyclopedia", 1975–1976, October 1975, vol, 52, no. 10 A, McGraw-Hill Inc., New York, page 27, 28 and 472 and U.S. Pat. Nos. 3,671,487, 3,723,373 and 3,838,092).

The compositions generally contain 0.01 to 1 parts by wt., preferably 0.05 to 0.6 parts by wt. of fluorinated polyolefin (based on 100 parts by wt. of the total composition).

Particularly preferred compositions contain

A) 60 to 98 parts by wt., preferably 70 to 95 parts by wt., particularly preferably 75 to 90 parts by wt. of at least one aromatic polycarbonate and/or polyester carbonate, B) 0.5 to 30 parts by wt., preferably 1 to 25 parts by wt., particularly 2 to 20 parts by wt. of at least one graft rubber according to component B, C) 0 to 40 parts by wt., preferably 0 to 30 parts by wt., particularly 0 to 20 parts by wt. of vinyl (co)polymer, D) 0.5 to 25 parts by wt., preferably 2 to 20 parts by wt., particularly 3 to 15 parts by wt. of at least one phosphorus compound selected from compounds corresponding to formula (III) or (IV) or mixtures thereof, E) 0.01 to 1.5 parts by wt., preferably 0.05 to 1 part by wt., particularly 0.1 to 0.8 parts by wt. of fluorinated polyolefin the sum of the parts by weight being 100.

In addition to the additives mentioned, the moulding compositions according to the invention may also contain stabilisers, pigments, fillers and reinforcing agents. Preferred fillers are glass beads, mica, silicates, quartz, talc, titanium dioxide or wollastonite. Preferred reinforcing agents are glass fibres or carbon fibres.

The moulding compositions according to the invention containing components A to D and optionally other known additives such as stabilisers, dyes, pigments, fillers and reinforcing agents and/or nucleating agents are prepared by mixing the relevant constituents in a known way and melt compounding or melt extruding at temperatures from 200° C. to 330° C. in conventional equipment such as internal mixers, extruders and twin-shaft screws.

The present invention thus also provides a process for the preparation of thermoplastic moulding compositions containing components A to D and optionally stabilisers, dyes, pigments, fillers and reinforcing agents and/or nucleating agents, which is characterised in that the components A to D and optionally stabilisers, dyes, pigments, flow control agents, fillers and reinforcing agents and/or nucleating agents, after being mixed, are melt compounded or melt extruded in conventional equipment at temperatures from 200° C. to 330° C.

The individual constituents may be mixed in a known way both successively and simultaneously, both at about 20° C. (room temperature) and at elevated temperature.

The moulding compositions of the present invention may be used for the manufacture of moulded parts of all kinds. In particular, moulded parts may be manufactured by injection moulding. Examples of moulded parts which may be manufactured are: housing parts of all kinds, e.g., for household appliances such as juice presses, coffee machines, mixers, for office machinery or cover plates for the building sector and parts for the automotive sector. They are also used in the field of electrical engineering because they have very good electrical properties.

The moulding compositions are particularly suitable for the manufacture of thin-walled moulded parts (e.g., data processing housing parts) where the plastics used have to meet particularly stringent requirements in terms of notched impact strength, elongation at break and stress cracking resistance.

Another form of processing is the manufacture of moulded parts by blow moulding or by thermoforming from previously produced sheets or films.

EXAMPLES

Components Used

A1: Polycarbonate based on bisphenol A with a relative solution viscosity of 1.28 measured in methylene chloride at 25° C. and at a concentration of 0.5 g/100 ml A2: Polycarbonate based on bisphenol A with a relative solution viscosity of 1.20 measured in methylene chloride at 25° C. and at a concentration of 0.5 g/100 ml B0: Graft polymer obtained by emulsion polymerisation of 40 parts by wt. of a monomer mixture of styrene and acrylonitrile (weight ratio 73:27) in the presence of 60 parts by wt. (calculated as solid) of a polybutadiene latex with an average particle size ($d_{50}$) of about 280 nm, addition of about 1.0 parts by wt. of a phenolic antioxidant, coagulation with a magnesium sulfate/acetic acid mixture and drying of the polymer powder, B1: 29 parts by wt. (calculated as solid) of an anionically emulsified polybutadiene latex prepared by free-radical polymerisation (latex B1) with a $d_{50}$ value of 277 run, a $d_{90}$-$d_{10}$ value of 44 run and a gel content of 58 wt. % and 29 parts by wt. (calculated as solid) of an anionically emulsified polybutadiene latex prepared by free-radical polymerisation (latex B2) with a $d_{50}$ value of 415 nm, a $d_{90}$-$d_{10}$ value of 144 nm and a gel content of 83 wt. % are brought to a solids content of about 20 wt. % with water, after which the mixture is heated to 70° C.

0.26 part by weight of tert.-butylhydroperoxide and 0.22 part by wt. of sodium ascorbate as well as 42 parts by weight of a monomer mixture (styrene/acrylonitrile= 73:27) are then metered in in parallel within 6 hours, the temperature being raised to 82° C. during the last 2 hours. In parallel to this 1.72 parts by weight (calculated as solid) of the sodium salt of a resin acid mixture (Dresinate 731, Abieta Chemie GmbH, Gersthofen) are metred in.

After a 4-hour post-reaction time, the graft latex is coagulated with a magnesium sulfate/acetic acid mixture after the addition of about 1.0 parts by wt. of a phenolic antioxidant, and after washing with water the resulting powder is dried under reduced pressure at 70° C.

C: Styrene/acrylonitrile copolymer mixture with a styrene/acrylonitrile ratio of 72:28 mole with a weight viscosity of 0.55 dl/g (measurement in dimethylformamide at 20° C.)

D1: Flame retardant: resorcinol-oligophosphate, Fyrolflex® RDP from AKZO Nobel Chemicals GmbH, Düren, Germany D2: Flame retardant: triphenylphosphate, Disflamoll® TP from Bayer AG, Leverkusen, Germany E: Fluorinated polyolefin: the tetrafluoroethylene polymer is used as a coagulated mixture of a graft polymer emulsion according to B1 in water and a tetrafluoroethylene polymer emulsion in water. The weight ratio graft polymer B1 to the tetrafluoroethylene polymer in the mixture is 90 wt. % to 10 wt. %. The tetrafluoroethylene polymer emulsion has a solids content of 60 wt. %, the particle size is from 50 nm to 500 nm. The graft polymer emulsion has a solids content of 34 wt. %.

Mould Release Agent: Pentaerythritol Tetrastearate

The components described above are homogeneously mixed in the amounts given in Table 1 in an internal mixer at about 200° C. to 220° C. and then converted to granular form.

TABLE 1

Composition and properties of the moulding compositions

|  |  | 1 (comparison) | 2 |
|---|---|---|---|
| A1 |  | 42.6 | 42.6 |
| B0 |  | 23.8 | — |
| B1 |  | — | 23.8 |
| C |  | 32.7 | 32.7 |
| Mould release agent |  | 0.4 | 0.4 |
| $a_k$ | [kJ/m²] | 57.9 | 70.0 |
| Vicat B 120 | [° C.] | 109 | 111 |
| Elongation at break | [%] | 23.2 | 114.4 |
| MVR (260/5) | [cm³/10 min] | 10.9 | 11.8 |

The determination of the Vicat B softening point is carried out in accordance with DIN 53 460 (ISO 306) on rods with the dimensions 80×10×4 mm.

The elongation at break is determined in accordance with ISO 527.

The MVR (melt volume flow rate) is determined according to ISO 1133. The notched impact strength is determined in accordance with ISO 180/1A.

The fire behaviour is measured according to UL-Subj. 94V on rods having the dimensions 127×12.7×1.6 mm, produced on an injection moulding machine at 260° C.

TABLE 2

Composition and properties of the moulding compositions

|  |  | 3 (comparison) | 4 |
|---|---|---|---|
| A2 |  | 69.0 | 69.0 |
| B0 |  | 6.6 | — |
| B1 |  | — | 6.6 |
| C |  | 8.9 | 8.9 |
| D1 |  | 8.1 | 8.1 |
| D2 |  | 2.7 | 2.7 |
| E |  | 4.2 | 4.2 |
| Mould release agent |  | 0.4 | 0.4 |
| $a_k$ | [kJ/m²] | 45 | 49 |
| Vicat B 120 | [° C.] | 96 | 98 |
| Elongation at break | [%] | 28 | 46 |
| MVR (260/5) | [ccm/10 min] | 42.7 | 49.4 |

TABLE 2-continued

Composition and properties of the moulding compositions

|  |  | 3 (comparison) | 4 |
|---|---|---|---|
| Total burning time UL 94 1.6 mm | [sec] | 38 | 22 |

Both in Table 1 and in Table 2 (flame resistant PC/ABS moulding compositions), the moulding compositions according to the invention which contain a special graft polymer exhibit marked improvements in properties in terms of notched impact strength and elongation at break.

What is claimed is:

1. A thermoplastic molding compositions comprising

A) 5 to 95 parts by wt. of at least one member selected from the group consisting of aromatic polycarbonate and polyester carbonate, B) 1 to 50 parts by wt. of at least one graft rubber, obtained by emulsion polymerization of styrene and acrylonitrile in the weight ratio 90:10 to 50:50, wherein styrene and/or acrylonitrile may be replaced wholly or partly by α-methylstyrene, methyl methacrylate or N-phenylmaleinimide, in the presence of at least two rubber lattices of type (B1) and (B2) which contain in each case 0 wt. % to 50 wt. % of a further vinyl comonomers in copolymerized form, and wherein the weight ratio of monomers used to rubber lattices used is 25:75 to 70:30, characterized in that the rubber latex (B1) has a particle diameter $d_{50}$ of ≦350 nm, a particle size distribution range (measured as $d_{90}$-$d_{10}$ from the integral particle size distribution) from 30 nm to 100 nm, and a gel content of ≦70 wt. %, and the rubber latex (B2) has a particle diameter $d_{50}$ of ≧350 nm, a particle size distribution range (measured as $d_{90}$-$d_{10}$ from the integral particle size distribution) from 50 nm to 500 nm, and a gel content of ≧70 wt. %, and the difference in the average particle diameter of B1 and B2 is ≧50 nm, C) 0 to 50 parts by wt. of at least one thermoplastic homo-, co- or terpolymer containing at least one monomer selected from the group consisting of styrene, α-methylstyrene, acrylonitrile, methyl methacrylate and N-substituted maleinimide, D) 0.5 to 25 parts by wt. of at least one flame retardant selected from the group consisting of compounds conforming to formula (III)

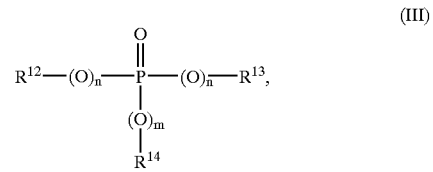

wherein $R^{12}$, $R^{13}$ and $R^{14}$ independently of one another, mean an optionally halogenated $C_1$–$C_8$-alkyl or an optionally halogenated and/or alkylated $C_5$ or $C_6$-cycloalkyl or an optionally halogenated and/or alkylated and/or aralkylated $C_6$–$C_{30}$-aryl, n and m independently of one another, are 0 or 1, and compounds corresponding to formula (IV)

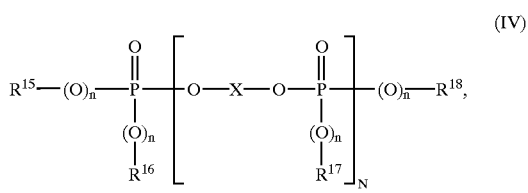

wherein $R^{15}, R^{16}, R^{17}, R^{18}$ independently of one another, mean $C_1$–$C_8$-alkyl, $C_5$–$C_6$-cycloalkyl, $C_6$–$C_{10}$-aryl, $C_7$–$C_{12}$-aralkyl, n independently of one another, means 0 or 1, N means 1 to 5 and X means a mono- or polynuclear aromatic radical having 6 to 30 carbon atoms,
and optionally at least one conventional additive, the sum of the parts by weight of the components totaling 100.

2. The composition according to claim 1 containing 10 to 90 parts by weight of aromatic polycarbonate or polyester carbonates or mixtures thereof.

3. The composition according to claim 1 containing 20 to 80 parts by weight of aromatic polycarbonate or polyester carbonates or mixtures thereof.

4. The composition according to claim 1 containing 2 to 40 parts by weight of component B.

5. The composition according to claim 1 containing 3 to 30 parts by weight of component B.

6. The composition according to claim 1 containing 0 to 40 parts by weight of component C.

7. The composition according to claim 1 containing 0 to 30 parts by weight of component C.

8. The composition according to claim 1 containing 2 to 20 parts by weight of component D.

9. The composition according to claim 1 wherein each of the rubber latices B1 and B2 independently is at least one member selected from the group consisting of diene rubbers, EP(D)M rubbers and acrylate rubbers.

10. The composition according to claim 1 wherein the rubber latices are diene rubbers.

11. The composition according to claim 1 wherein the further vinyl comonomer is at least one member selected from the group consisting of isoprene, chloroprene, acrylonitrile, styrene, α-methylstyrene, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates and divinylbenzene.

12. The composition according to claim 11 wherein the further vinyl comonomer is selected from the group consisting of styrene, acrylonitrile, methyl(meth)acrylate and mixtures thereof.

13. A molded article comprising the composition of claim 1.

14. An extruded article comprising the composition of claim 1.

15. The composition according to claim 1 wherein the conventional additive is at least one member selected from the group consisting of further flame retarding agent, antistatic, stabilizer, pigment, dye, filler, reinforcing agent, mold release agent and nucleating agent.

16. The composition of claim 1 wherein the flame retardant conforms to formula (III) and wherein $R^{12}, R^{13}$ and $R^{14}$ independently of one another denote phenyl or its halogenated or alkylated derivatives and wherein n and m denote 1.

17. The composition of claim 1 wherein the flame retardant conforms to formula (IV) and wherein $R^{15}, R^{16}, R^{17}$ and $R^{18}$ independently of one another denote phenyl or its halogenated or alkylated derivatives, n denotes 1, and X denotes a derivative of a member selected from the group consisting of bisphenol A, hydroquinone and resorcinol.

* * * * *